United States Patent
Child et al.

(10) Patent No.: US 12,229,424 B2
(45) Date of Patent: *Feb. 18, 2025

(54) CLOUD DATA SHARING FOR APPLICATIONS

(71) Applicant: Snowflake Inc., Bozeman, MT (US)

(72) Inventors: Christopher Peter Child, Tiburon, CA (US); Matthew J. Glickman, Larchmont, NY (US); Justin Langseth, Kailua, HI (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/162,692

(22) Filed: Jan. 31, 2023

(65) Prior Publication Data
US 2023/0169202 A1 Jun. 1, 2023

Related U.S. Application Data

(63) Continuation of application No. 17/163,061, filed on Jan. 29, 2021, which is a continuation of application
(Continued)

(51) Int. Cl.
*G06F 3/06* (2006.01)
*G06F 16/2457* (2019.01)
(Continued)

(52) U.S. Cl.
CPC ...... *G06F 3/0637* (2013.01); *G06F 16/24573* (2019.01); *G06F 16/248* (2019.01);
(Continued)

(58) Field of Classification Search
CPC .......... G06F 21/6227; G06F 21/31; G06F 2221/2141; G06F 3/0637
See application file for complete search history.

(56) References Cited

U.S. PATENT DOCUMENTS 6,202,066 B1   3/2001   Barkley et al.
6,934,706 B1   8/2005   Mancuso et al.
(Continued)

FOREIGN PATENT DOCUMENTS

CN   1969573      5/2007
CN   103020501    4/2013
(Continued)

OTHER PUBLICATIONS

YouTube video by username MDTechVideos, "How to Sign Into Your Google Account," published Nov. 21, 2018, downloaded from https://www.youtube.com/watch?v=E40UEoa19As (Year: 2018).*
(Continued)

*Primary Examiner* — Eric J Yoon
(74) *Attorney, Agent, or Firm* — Schwegman Lundberg & Woessner, P.A.

(57) ABSTRACT

A request to share cloud data associated with a first account in a database system with an application is received. Based on the request, second-party application data and third-party data that is accessible by the first account is identified. The second-party application data comprises application data corresponding to a second application provided by a second-party application provider. The third-party data corresponds to a second account maintained by the database system. The second account corresponds to a third-party data provider. The application is enabled to access the cloud data associated with the first account based on the request. The cloud data comprises customer data associated with the first account, second-party application data, and the third-party data.

29 Claims, 9 Drawing Sheets

Related U.S. Application Data

No. 17/162,376, filed on Jan. 29, 2021, now Pat. No. 11,244,067.

(60) Provisional application No. 63/112,831, filed on Nov. 12, 2020.

(51) Int. Cl.
  *G06F 16/248* (2019.01)
  *G06F 16/25* (2019.01)
  *G06F 16/28* (2019.01)
  *G06F 21/31* (2013.01)
  *G06F 21/62* (2013.01)

(52) U.S. Cl.
  CPC .......... *G06F 16/256* (2019.01); *G06F 16/283* (2019.01); *G06F 16/287* (2019.01); *G06F 21/31* (2013.01); *G06F 21/6227* (2013.01)

(56) References Cited

U.S. PATENT DOCUMENTS

| | | | |
|---|---|---|---|
| 8,850,209 | B2 | 9/2014 | Dutta et al. |
| 9,450,945 | B1 | 9/2016 | Koeten et al. |
| 9,596,216 | B1 | 3/2017 | North et al. |
| 9,853,959 | B1 | 12/2017 | Kapczynski et al. |
| 10,156,841 | B2 | 12/2018 | Wu et al. |
| 10,162,982 | B2 | 12/2018 | De Oliveira et al. |
| 10,375,174 | B2 | 8/2019 | Haidar et al. |
| 10,990,693 | B1 | 4/2021 | Newman |
| 11,244,067 | B1 | 2/2022 | Child et al. |
| 11,341,261 | B2 | 5/2022 | Moore |
| 11,341,264 | B1 | 5/2022 | Child et al. |
| 11,544,401 | B2 | 1/2023 | Child et al. |
| 2010/0299371 | A1* | 11/2010 | Little .................. G06F 16/116 707/E17.124 |
| 2011/0173168 | A1 | 7/2011 | Jones et al. |
| 2011/0258683 | A1 | 10/2011 | Cicchitto |
| 2012/0110330 | A1 | 5/2012 | Dickgiesser et al. |
| 2013/0024919 | A1 | 1/2013 | Wetter et al. |
| 2013/0282657 | A1* | 10/2013 | Besen ................ G06F 16/1844 707/625 |
| 2014/0082350 | A1 | 3/2014 | Zarfoss, III et al. |
| 2016/0055571 | A1 | 2/2016 | Wouhaybi et al. |
| 2017/0076105 | A1 | 3/2017 | Paulovicks et al. |
| 2018/0034824 | A1 | 2/2018 | Maycotte et al. |
| 2019/0068612 | A1* | 2/2019 | Eads .................... H04L 63/105 |
| 2019/0287168 | A1 | 9/2019 | Williams, III et al. |
| 2020/0050686 | A1* | 2/2020 | Kamalapuram ...... G06F 21/564 |
| 2020/0226101 | A1* | 7/2020 | Dhanabalan ........ H04L 65/1083 |
| 2020/0285610 | A1 | 9/2020 | Wang et al. |
| 2021/0286891 | A1 | 9/2021 | Sislow et al. |
| 2022/0027417 | A1 | 1/2022 | Katz et al. |
| 2022/0147646 | A1 | 5/2022 | Child et al. |
| 2022/0147647 | A1 | 5/2022 | Child et al. |
| 2022/0245273 | A1 | 8/2022 | Child et al. |

FOREIGN PATENT DOCUMENTS

| | | |
|---|---|---|
| CN | 103067398 | 4/2013 |
| CN | 116457769 | 7/2023 |
| WO | WO-2022/104300 A1 | 5/2022 |

OTHER PUBLICATIONS

P. Gralla, "Review: 3 services for managing all your cloud storage accounts," Computerworld website, dated Jan. 30, 2017, downloaded from https://www.computerworld.com/article/3162093/review-3-services-for-managing-all-your-cloud-storage-accounts.html (Year: 2017).*
U.S. Appl. No. 17/162,376 U.S. Pat. No. 11,244,067, filed Jan. 29, 2021, Data Cloud Connected Applications.
U.S. Appl. No. 17/163,061, filed Jan. 29, 2021, Enabling Applications to Access Cloud Data.
U.S. Appl. No. 17/646,191 U.S. Pat. No. 11,341,264, filed Dec. 28, 2021, Enabling Application Access to Cloud Data.
U.S. Appl. No. 17/659,732 U.S. Pat. No. 11,544,401, filed Apr. 19, 2022, Sharing Cloud Data With an Application.
"U.S. Appl. No. 17/162,376, Examiner Interview Summary mailed May 11, 2021", 2 pgs.
"U.S. Appl. No. 17/162,376, Final Office Action mailed Jun. 11, 2021", 17 pgs.
"U.S. Appl. No. 17/162,376, Non-Final Office Action mailed Apr. 1, 2021", 16 pgs.
"U.S. Appl. No. 17/162,376, Notice of Allowance mailed Dec. 13, 2021", 18 pgs.
"U.S. Appl. No. 17/162,376, Response filed Apr. 29, 2021 to Non-Final Office Action mailed Apr. 1, 2021", 11 pgs.
"U.S. Appl. No. 17/162,376, Response filed Sep. 13, 2021 to Final Office Action mailed Jun. 11, 2021", 10 pgs.
"U.S. Appl. No. 17/163,061, Preliminary Amendment filed Jul. 1, 2021", 7 pgs.
"U.S. Appl. No. 17/646,191, Notice of Allowance mailed Mar. 18, 2022", 19 pgs.
"U.S. Appl. No. 17/659,732, Non-Final Office Action mailed Jun. 9, 2022", 7 pgs.
"U.S. Appl. No. 17/659,732, Notice of Allowance mailed Sep. 15, 2022", 7 pgs.
"U.S. Appl. No. 17/659,732, Response filed Aug. 31, 2022 to Non-Final Office Action mailed Jun. 9, 2022", 10 pgs.
"International Application Serial No. PCT/US2021/070807, International Search Report mailed Sep. 30, 2021", 2 pgs.
"International Application Serial No. PCT/US2021/070807, Written Opinion mailed Sep. 30, 2021", 7 pgs.
Team, Zapier, "The Ultimate Guide to G Suite", [online]. Retrieved from the Internet: <URL: https://zapier.com/learn/g-suite/>, (May 18, 2017). 115 pgs.
"International Application Serial No. PCT/US2021/070807, International Preliminary Report on Patentability mailed May 25, 2023", 9 pgs.
"European Application Serial No. 21893049.3, Response to Communication pursuant to Rules 161(1) and 162 EPC filed Dec. 19, 2023", 68 pgs.
"U.S. Appl. No. 17/163,061, Response filed Jan. 29, 2024 to Non Final Office Action mailed Oct. 31, 2023", 14 pgs.
"U.S. Appl. No. 17/163,061, Final Office Action mailed Feb. 16, 2024", 20 pgs.
"Chinese Application Serial No. 202180076400.9, Office Action mailed Feb. 8, 2024", with English translation, 15 pages.
"German Application Serial No. 202021004328.4, Office Action mailed Aug. 29, 2023", with English translation, 4 pages.
"German Application Serial No. 202021004328.4, Response filed Sep. 28, 2023 to Office Action mailed Aug. 29, 2023", with machine English translation, 99 pages.
"Chinese Application Serial No. 202180076400.9, Response filed Jun. 4, 2024 to Office Action mailed Sep. 3, 2024", with English claims, 11 pages.
"U.S. Appl. No. 17/163,061, Non Final Office Action mailed Oct. 31, 2023", 42 pgs.
"U.S. Appl. No. 17/163,061, Response filed Apr. 15, 2024 to Final Office Action mailed Feb. 16, 2024", 15 pages.
"Chinese Application Serial No. 202180076400.9, Response filed Jun. 4, 2024 to Office Action mailed Feb. 8, 2024", with manual English translation, 12 pages.
"Chinese Application Serial No. 202180076400.9, Office Action mailed Jun. 8, 2024", with English translation, 8 pages.
"Chinese Application Serial No. 202180076400.9, Response filed Aug. 7, 2024 to Office Action mailed Jun. 8, 2024", with English claims, 24 pages.
"Chinese Application Serial No. 202180076400.9, Office Action mailed Sep. 3, 2024", with English translation, 15 pages.
"Chinese Application Serial No. 202180076400.9, Response filed Oct. 31, 2024 to Office Action mailed Sep. 3, 2024", with English claims, 14 pages.

(56) References Cited

OTHER PUBLICATIONS

"European Application Serial No. 21893049.3, Extended European Search Report mailed Oct. 4, 2024", 6 pgs.

* cited by examiner

CLOUD DATA SHARING FOR APPLICATIONS

CROSS-REFERENCE TO RELATED APPLICATION

This application is a Continuation of U.S. patent application Ser. No. 17/163,061, filed Jan. 29, 2021, which application is a Continuation of U.S. patent application Ser. No. 17/162,376, filed on Jan. 29, 2021, which claims priority to U.S. Provisional Patent Application Ser. No. 63/112,931, filed on Nov. 12, 2020, the contents of each of which are incorporated by reference in their entirety.

TECHNICAL FIELD

Embodiments of the disclosure relate generally to databases and, more specifically, to enabling applications to access data in a database system.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed.

BRIEF DESCRIPTION OF THE DRAWINGS

The present disclosure will be understood more fully from the detailed description given below and from the accompanying drawings of various embodiments of the disclosure.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure address a multi-tenant database system that supports sharing of user data with a multi-tenant application. The application includes a user interface that exposes an element that allows a user of the application to incorporate their data cloud assets (including first, second, third-party assets) into the application context to enrich the experience. Once the connection is established, the application can use specified data for a specified context and can also add more data to the user's data graph.

Figure 1:
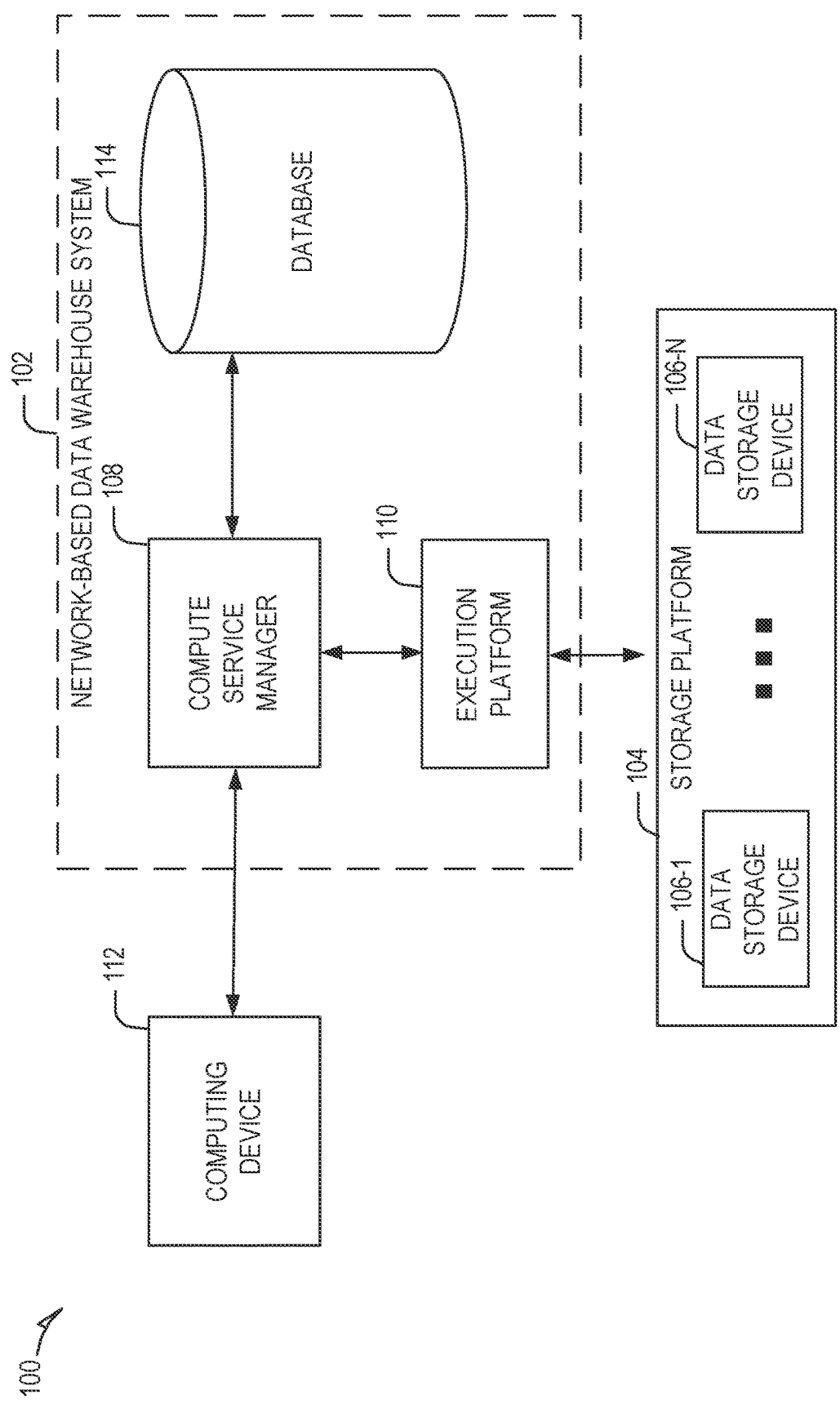
FIG. 1 illustrates an example computing environment that includes a network-based database system in communication with a cloud storage provider system, in accordance with some embodiments of the present disclosure.

FIG. 1 illustrates an example computing environment 100 that includes a database system 102 in communication with a storage platform 104, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the computing environment 100 comprises the database system 102 and a storage platform 104 (e.g., AWS®, Microsoft Azure Blob Storage®, or Google Cloud Storage®). The database system 102 is used for reporting and analysis of integrated data from one or more disparate sources including storage devices 106-1 to 106-N within the storage platform 104. The storage platform 104 comprises a plurality of computing machines and provides on-demand computer system resources such as data storage and computing power to the database system 102.

The database system 102 comprises a compute service manager 108, an execution platform 110, and a database 114. The database system 102 hosts and provides data reporting and analysis services to multiple client accounts. Administrative users can create and manage identities (e.g., users, roles, and groups) and use permissions to allow or deny access to the identities to resources and services.

The compute service manager 108 coordinates and manages operations of the database system 102. The compute service manager 108 also performs query optimization and compilation as well as managing clusters of computing services that provide compute resources (also referred to as "virtual warehouses"). The compute service manager 108 can support any number of client accounts, such as end users providing data storage and retrieval requests, system administrators managing the systems and methods described herein, and other components/devices that interact with compute service manager 108.

The compute service manager 108 is also in communication with a computing device 112. The computing device 112 corresponds to a user of one of the multiple client accounts supported by the database system 102. In some embodiments, the compute service manager 108 does not receive any direct communications from the computing device 112 and only receives communications concerning jobs from a queue within the database system 102.

The compute service manager 108 is also coupled to database 114, which is associated with the data stored in the computing environment 100. The database 114 stores data pertaining to various functions and aspects associated with the database system 102 and its users. In some embodiments, the database 114 includes a summary of data stored in remote data storage systems as well as data available from a local cache. Additionally, the database 114 may include information regarding how data is organized in remote data storage systems (e.g., the storage platform 104) and the local caches. The database 114 allows systems and services to determine whether a piece of data needs to be accessed without loading or accessing the actual data from a storage device.

The compute service manager 108 is further coupled to the execution platform 110, which provides multiple computing resources that execute various data storage and data retrieval tasks. The execution platform 110 is coupled to storage platform 104. The storage platform 104 comprises multiple data storage devices 106-1 to 106-N. In some embodiments, the data storage devices 106-1 to 106-N are cloud-based storage devices located in one or more geographic locations. For example, the data storage devices 106-1 to 106-N may be part of a public cloud infrastructure or a private cloud infrastructure. The data storage devices 106-1 to 106-N may be hard disk drives (HDDs), solid state drives (SSDs), storage clusters, Amazon S3TM storage systems, or any other data storage technology. Additionally, the storage platform 104 may include distributed file systems (e.g., Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete database partition files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 106-1 to 106-N are decoupled from the computing resources associated with the execution platform 110. This architecture supports dynamic changes to the database system 102 based on the changing data storage/retrieval needs as well as the changing needs of the users and systems. The support of dynamic changes allows the database system 102 to scale quickly in response to changing demands on the systems and components within the database system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 108, database 114, execution platform 110, and storage platform 104 are shown in FIG. 1 as individual discrete components. However, each of the compute service manager 108, database 114, execution platform 110, and storage platform 104 may be implemented as a distributed system (e.g., distributed across multiple systems/platforms at multiple geographic locations). Additionally, each of the compute service manager 108, database 114, execution platform 110, and storage platform 104 can be scaled up or down (independently of one another) depending on changes to the requests received and the changing needs of the database system 102. Thus, in the described embodiments, the database system 102 is dynamic and supports regular changes to meet the current data processing needs.

During typical operation, the database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the database 114 assists the compute service manager 108 in determining which nodes in the execution platform 110 have already cached at least a portion of the data needed to process the task. One or more nodes in the execution platform 110 process the task using data cached by the nodes and, if necessary, data retrieved from the storage platform 104. It is desirable to retrieve as much data as possible from caches within the execution platform 110 because the retrieval speed is typically much faster than retrieving data from the storage platform 104.

As shown in FIG. 1, the computing environment 100 separates the execution platform 110 from the storage platform 104. In this arrangement, the processing resources and cache resources in the execution platform 110 operate independently of the data storage devices 106-1 to 106-N in the storage platform 104. Thus, the computing resources and cache resources are not restricted to specific data storage devices 106-1 to 106-N. Instead, all computing resources and all cache resources may retrieve data from, and store data to, any of the data storage resources in the storage platform 104.

Figure 2:
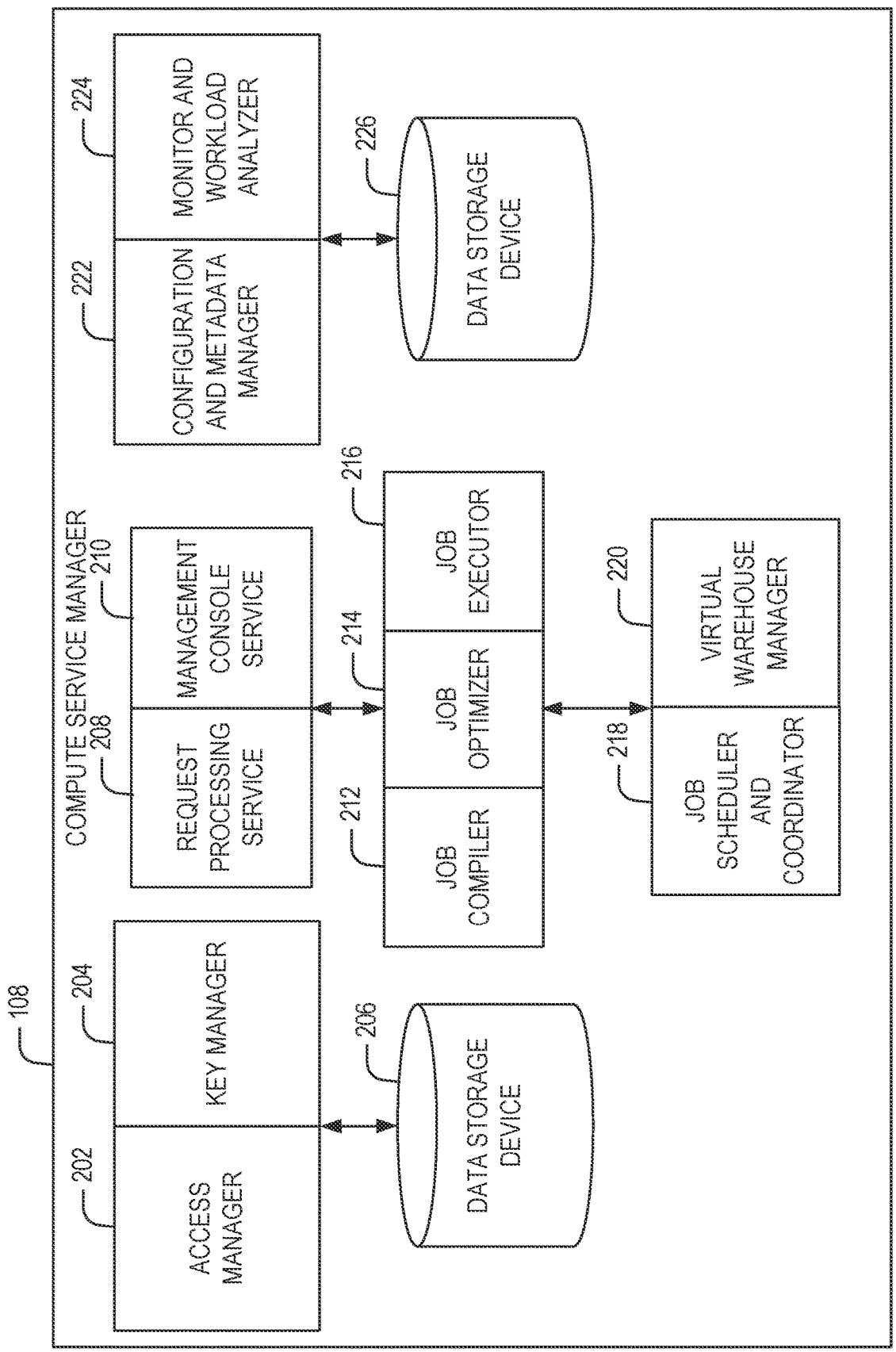
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in storage platform 104). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which partitions need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the database system 102 and may further redistribute tasks based on a user (e.g., "external") query workload. The execution platform 110 may also redistribute tasks based on a user (e.g., "external") query workload. The configuration and metadata manager 222 and the monitor and workload analyzer 224 are coupled to a data storage device 226. Data storage device 226 in FIG. 2 represents any data storage device within the database system 102. For example, data storage device 226 may represent caches in execution platform 110, storage devices in storage platform 104, or any other storage device.

Figure 3:
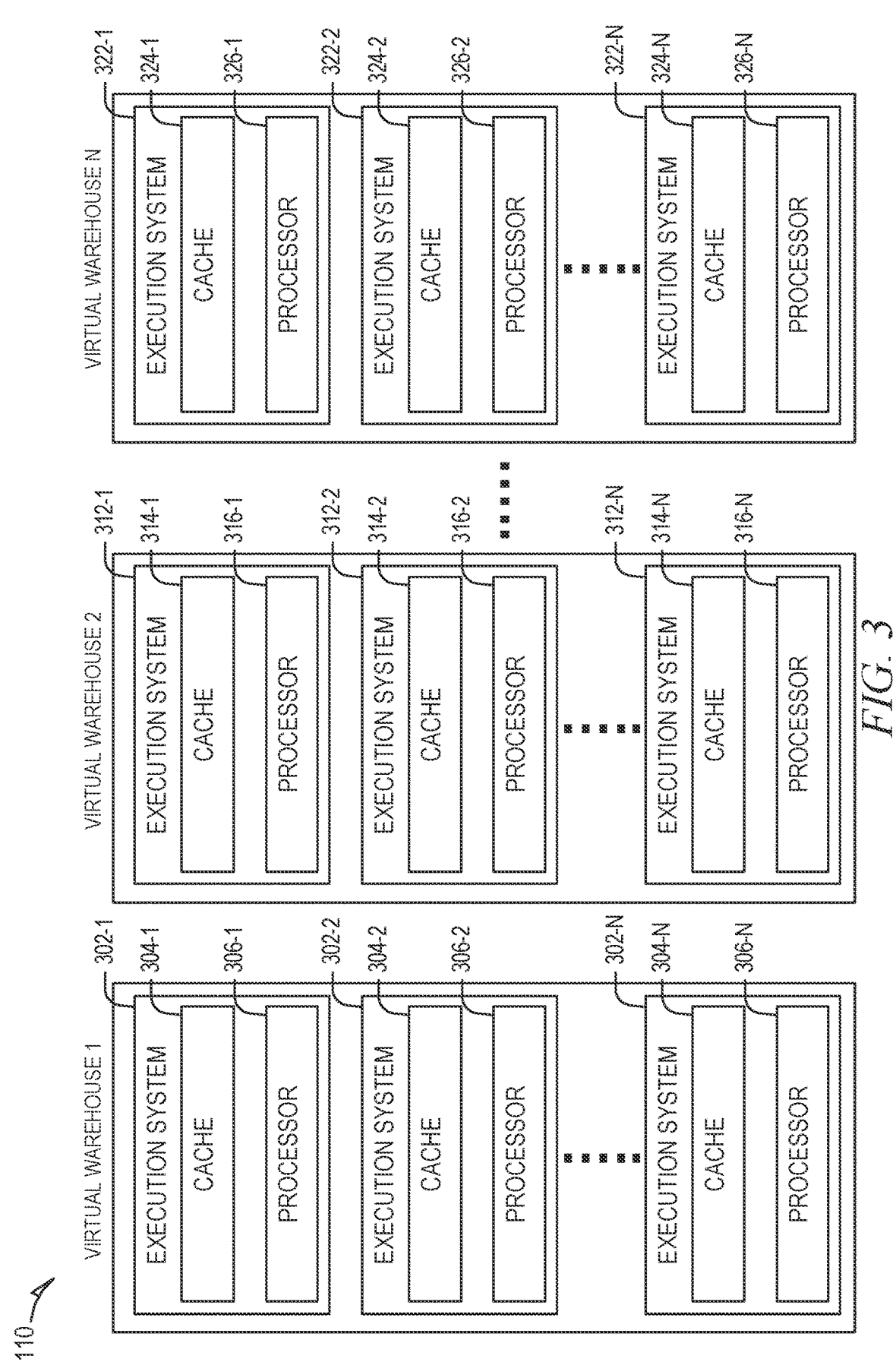
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each includes a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 106-1 to 106-N shown in FIG. 1. Thus, the virtual warehouses are not necessarily assigned to a specific data storage device 106-1 to 106-n and, instead, can access data from any of the data storage devices 106-1 to 106-N within the storage platform 104. Similarly, each of the execution nodes shown in FIG. 3 can access data from any of the data storage devices 106-1 to 106-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4A:
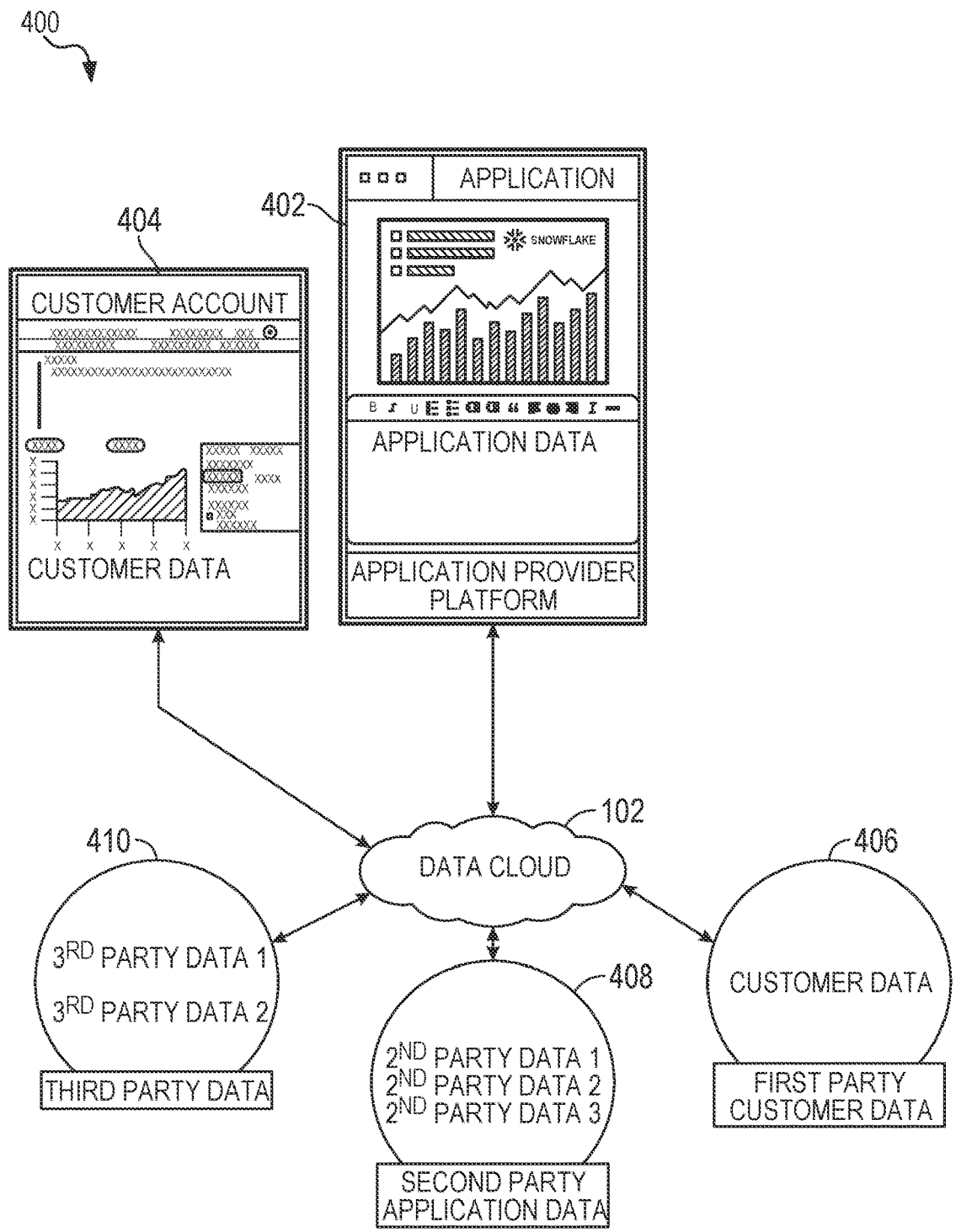
FIGS. 4A and 4B illustrates an example computing environment in which an application is connected to a database system, in accordance with some embodiments of the present disclosure.
Figure 4B:
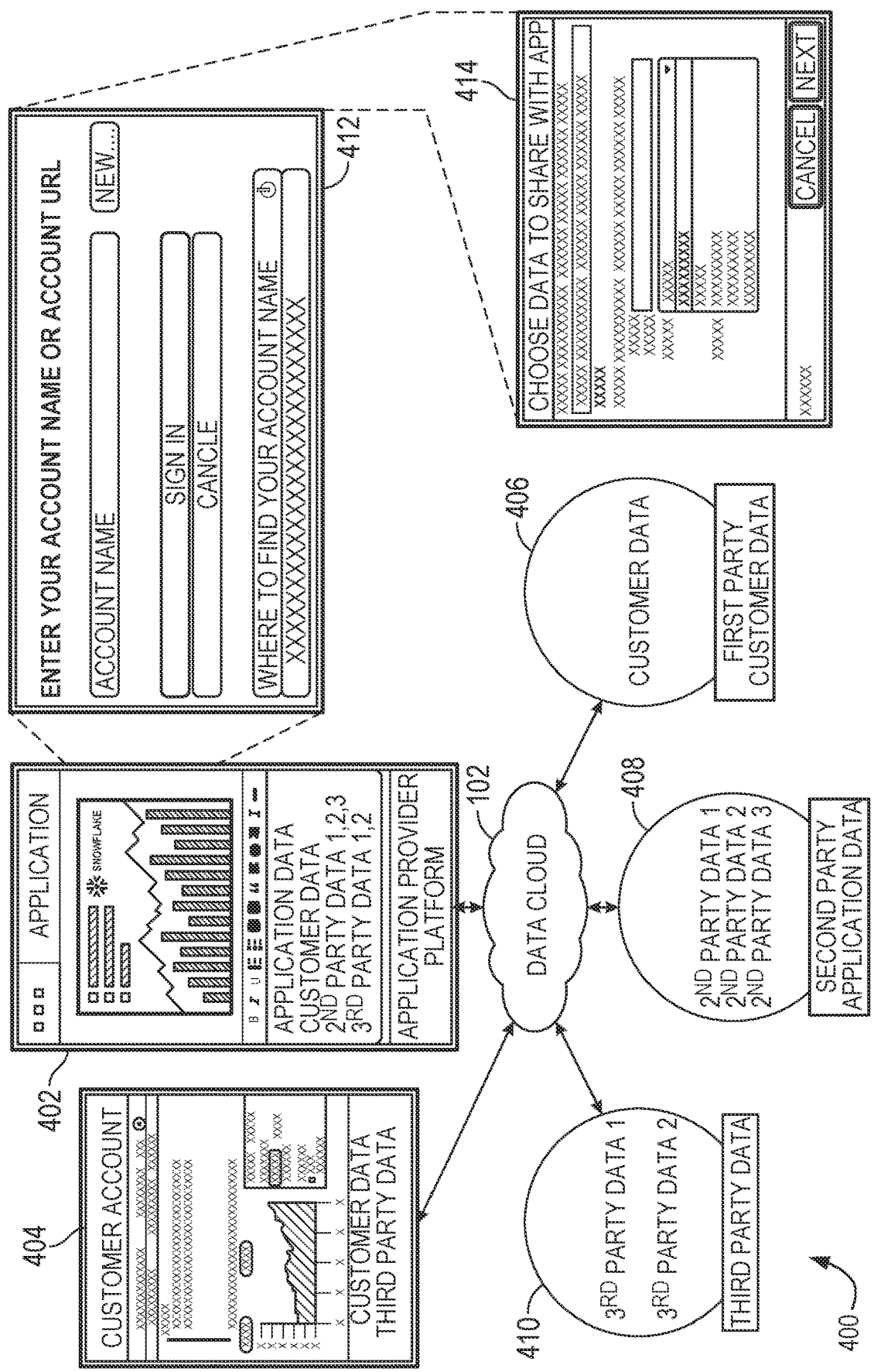

FIGS. 4A and 4B illustrates an example computing environment 400 in which an application 402 (a software application) is connected to the database system 102, in accordance with some embodiments of the present disclosure. As shown in FIG. 4A, the application 402 executes on an application provider platform. Initially, the application 402 only has access to application data owned by the application provider (e.g., application data created and managed by the application 402). The application data is stored and maintained by the database system 102.

A user of the application 402 may be associated with a customer account 404 provided by the database system 102. Customer data 406 associated with the customer account 404 is maintained by the database system 102. The customer account 404 within the database system 102 is granted access to second-party application data 408 and third-party data 410. The second-party application data 408 can include application data corresponding to one or more other applications. For example, the second-party application data 408 can include application data created, managed, and/or consumed by a second application. The second-party application data 408 is associated with one or more second-party application provider accounts maintained by the database system 102. Each second-party application provider account corresponds to a second-party application provider. The third-party data 410 can include data from one or more third-party data providers corresponding to one or more accounts maintained by the database system 102. For example, the third-party data 410 can include customer data associated with a second customer account provider by the database system 102.

With reference to FIG. 4B, to enable the user of the application 402 to provide the application 402 access to the customer data 406 as well as the second-party application data 408 and third-party data 410, the application 402 presents a user interface (UI) element 412 to receive security credentials associated with the customer account 404 to authenticate the user as an authorized user of the customer account 404. The UI element 412 can include one or more input fields along with a prompt for the user to input security credentials associated with the customer account 404 (e.g., a username and password). The security credentials are provided by the application 402 to the database system 102. The database system 102 authenticates the security credentials, and in response to the database system 102 successfully authenticating the security credentials, the application 402 presents UI element 414 that allows the user to specify data to be shared with the application 402. The application 402 can display the UI element 414 in response to receiving an indication from the database system 102 of successful authentication or the database system 102 can cause the application 402 to display the UI element 414 (e.g., by providing instructions to the computing device executing the application 402 that cause the computing device to present the UI element 414) in response to successful authentication. From the UI element 414, the user can specify one or more databases or one or more portions of a database to be shared with the application 402.

As an example, the user can use the UI element 414 to establish a connection that allows the application 402 to use any one or more of the customer data 406, the second-party application data 408, and the third-party data 410. That is, the user can use the UI element 414 to share data from a database that is within the customer account 404, an account of a second-party application data provider, or an account of a third-party data provider, or to share data from a database that includes a combination of any one or more of customer data, second-party application data, and third-party data.

The user may further specify a context in which data is to be used by the application 402. That is, the user can specify one or more limitations on use of the data by the application 402. For example, the user may limit access to portions of the database or restrict access to one or more portions of the second-party application data 408 or third-party data 410. As another example, the user can specify read and write permissions for the application 402 associated with any one or more of the customer data 406, the second-party application data 408, or the third-party data 410.

A request to share cloud data with the application 402 is generated based on user input provided to the UI element 414 and the request is submitted to the database system 102. The database system 102 provides access to the cloud data specified in the request to the application 402. In the example illustrated in FIG. 4B, the cloud data includes the customer data 406, the second-party application data 408, and the third-party data 410. That is, the database system 102 enables the application 402 to access the customer data 406, the second-party application data 408, and the third-party data 410 in accordance with any restrictions on use specified in the request.

Consistent with some embodiments, prior to providing access to the data to the application 402, the database system 102 can perform one or more validations to validate a schema or format of the data to ensure compatibility with the application 402. The database system 102 may further perform one or more normalization operations on the data prior to providing access to the application 402.

Figure 5:
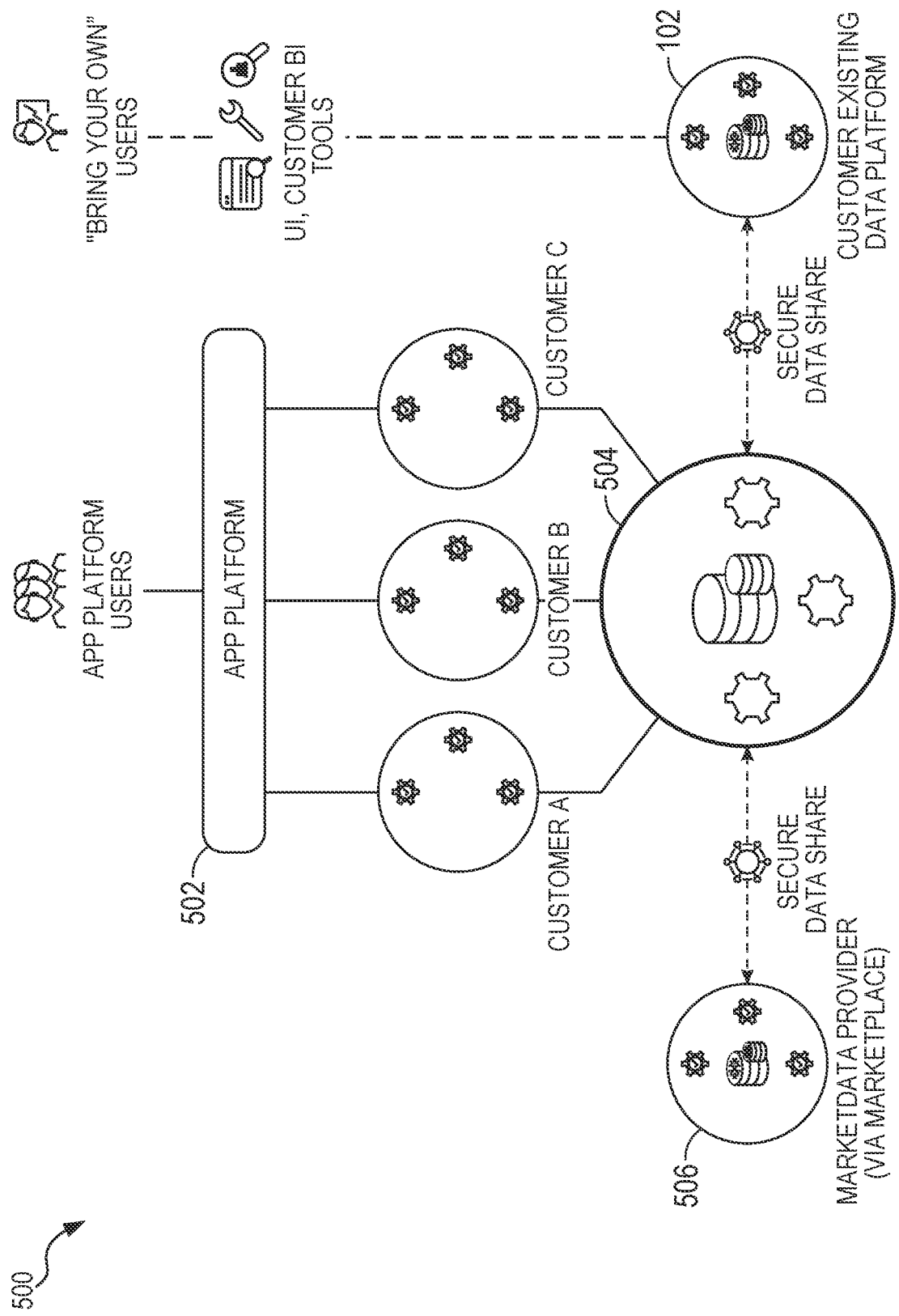
FIG. 5 illustrates an example architecture to support applications with connections to a database system, in accordance with some embodiments of the present disclosure.

FIG. 5 illustrates an example architecture 500 to support cloud data sharing between applications (e.g., application 402) and the database system, in accordance with some embodiments of the present disclosure. As shown, the architecture 500 includes an application platform 502 that supports a multi-tenant application. The application platform 502 utilizes data 504 that includes application data (e.g., customer data 406) as well as data obtained from a data marketplace 506 (e.g., second-party application data 408 and third-party data 410). Access to the data 504 can be provisioned to customers A, B, and C of the application platform 502. As shown, customer data from a customer account within the database system 102 is shared with and used by the application platform 502. Second-party application data and third-party data that the customer account is permitted to access can also be shared with the application platform 502.

Figure 6:
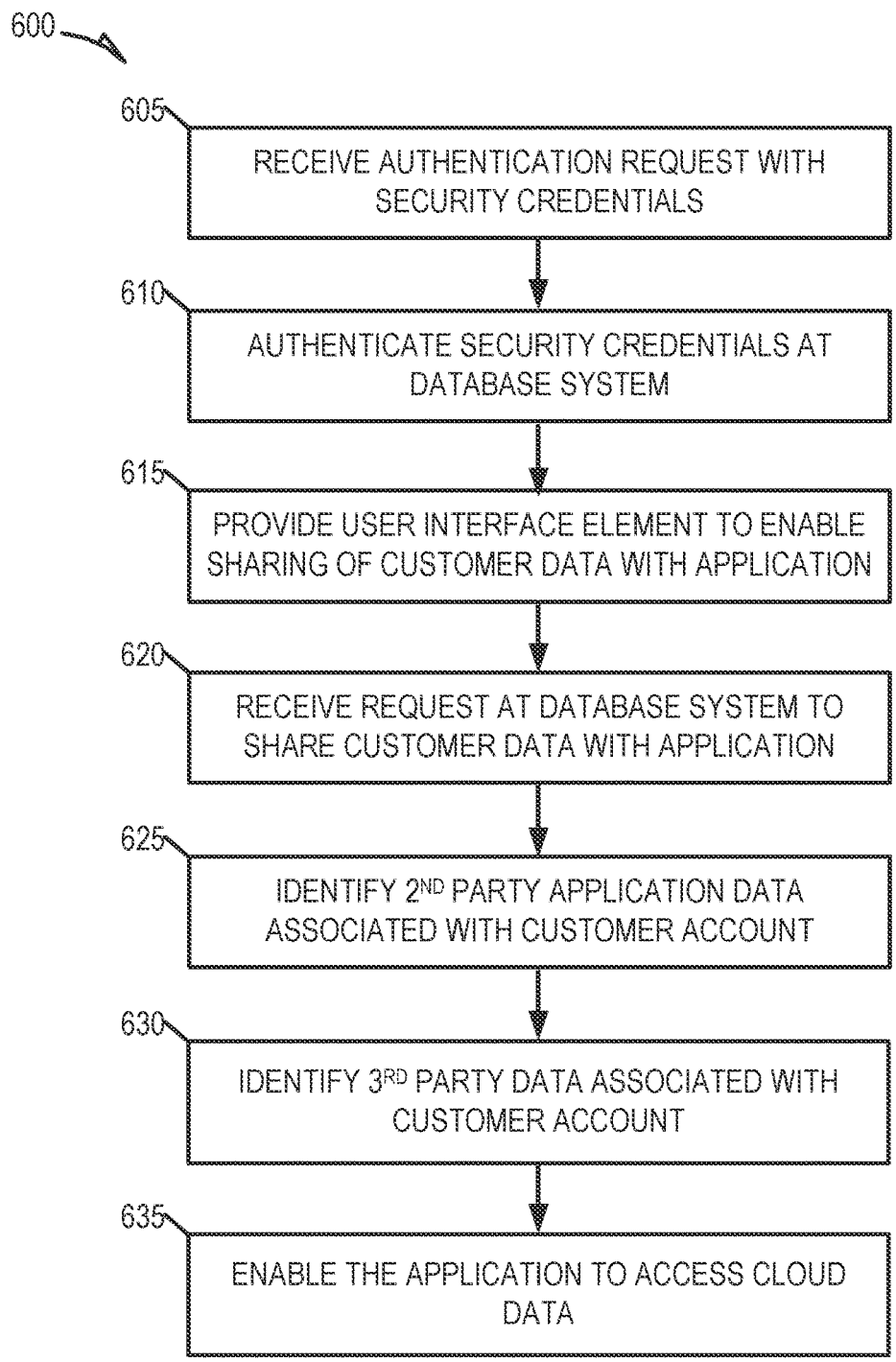
FIGS. 6 and 7 are flow diagrams illustrating operations of the database system in performing a method for connecting an application to a database system, in accordance with some embodiments of the present disclosure.
Figure 7:
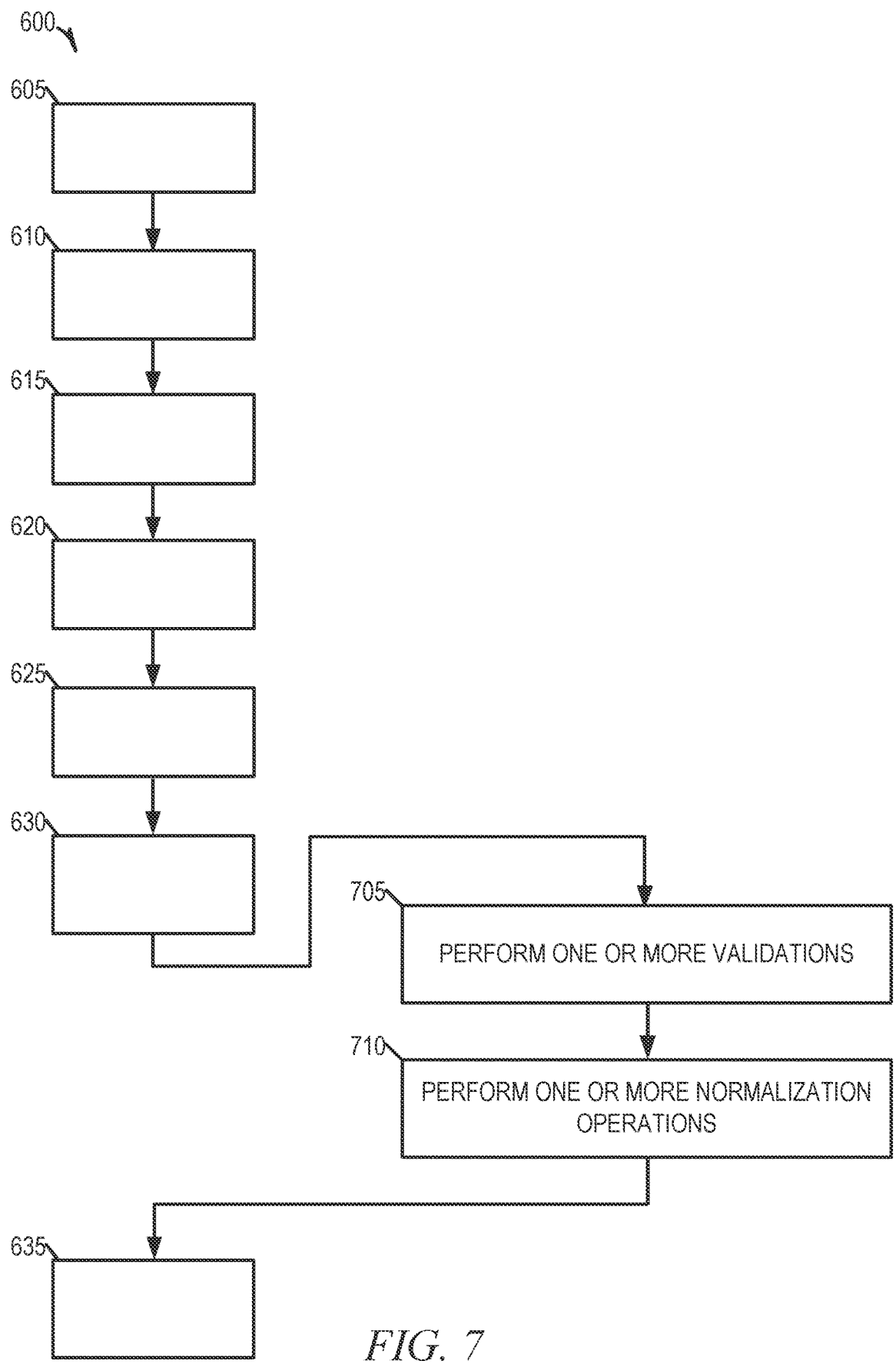

FIGS. 6 and 7 are flow diagrams illustrating operations of the database system 102 in performing a method 600 for connecting an application to a database system 102, in accordance with some embodiments of the present disclosure. The method 600 may be embodied in computer-readable instructions for execution by one or more hardware components (e.g., one or more processors) such that the operations of the method 600 may be performed by components of database system 102. Accordingly, the method 600 is described below, by way of example with reference thereto. However, it shall be appreciated that the method 600 may be deployed on various other hardware configurations and is not intended to be limited to deployment within the database system 102.

Depending on the embodiment, an operation of the method 600 may be repeated in different ways or involve intervening operations not shown. Though the operations of the method 600 may be depicted and described in a certain order, the order in which the operations are performed may vary among embodiments, including performing certain operations in parallel or performing sets of operations in separate processes. For example, although the use and generation of the pruning index are described and illustrated together as part of the method 600, it shall be appreciated that the use and generation of the restricted view may be performed as separate processes, consistent with some embodiments.

At operation 605, the database system 102 receives an authentication request associated with a request to share customer data with an application. The authentication request includes security credentials (e.g., a username and password) associated with a first account provided by the database system 102 (e.g., a customer account). In some embodiments, the authentication request can be received from a computing device executing the application and based on input provided by a user via a first user interface element presented by the application. In some embodiments, the authentication request can be received by a computing device in communication with the database system 102 and based on user input provided to a UI provided by the database system 102.

At operation 610, the database system 102 authenticates the security credentials and, based on successful authentication of the security credentials, the database system 102 provides a UI element to share customer data with the application, at operation 615. In embodiments in which the authentication request is provided based on user interaction with the application, the database system 102 may cause a computing device executing the application to display a second UI element for the customer to share customer data with the application.

At operation 620, the database system 102 receives a request to share customer data in the first account with an application. In some embodiments, the request can be received, for example, from the computing device executing the application. The request can be generated at the computing device executing the application based on input received from the user associated with the first account via the second interface element. In some embodiments, the request is generated based on user input received via a user interface provided by the database system 102 to a computing device without the computing device executing the application. That is, a user can submit a request to share data with an application from a first computing device without interacting directly with the application or a second computing device on which the application is executable.

The request can specify a particular context in which the application can use the customer data. For example, the request can indicate one or more limits on the manner in which the customer data is used by the application (e.g., limits on the application read or write permissions with respect to one or more portions of the data). As another example, the request can specify whether the application is able to access second-party application data and/or third-party data that is accessible by the customer account.

At operation 625, the database system 102 identifies second-party application data that is accessible by the first account, and at operation 625, the database system 102 identifies third-party data that is accessible by the first account. The second-party application data comprises application data corresponding to a second application (e.g., data created, managed, and/or consumed by a second application) associated with a second account (e.g., a second-party application provider account) maintained by the database system 102. The second account corresponds to a second-party application provider. The third-party data can include data from a third-party data provider corresponding to a third account (e.g., a third-party data provider account) maintained by the database system 102. For example, the third-party data can correspond to customer data associated with a second customer account provider by the database system 102. In instances in which the request restricts access of the application to the second-party application data or the third-party data, the database system 102 may not perform operation 625 or 630.

At operation 635, the database system 102 enables the application to access cloud data associated with the customer account. The cloud data includes the customer data, the second-party application data, and third-party data associated with the customer account. In instances in which the request to share the customer data includes one or more limits on use of the cloud data, the enabling of the application to access the cloud data further includes restricting use of the cloud data by the application according to the one or more limits.

As shown in FIG. 7, the method 600 can further include operations 705 and 710, in some embodiments. Consistent with these embodiments, the operations 705 and 710 can be performed prior to operation 635 where the database system 102 enables the application to access the cloud data associated with the customer account.

At operation 705, the database system 102 performs one or more validations of the cloud data to ensure it is compatible with the application. As an example, the one or more validations can include any one or more of validation a format of the cloud data and validation a schema of the cloud data. At operation 710, the database system 102 performs one or more normalizations on the cloud data to normalize the cloud data.

Figure 8:
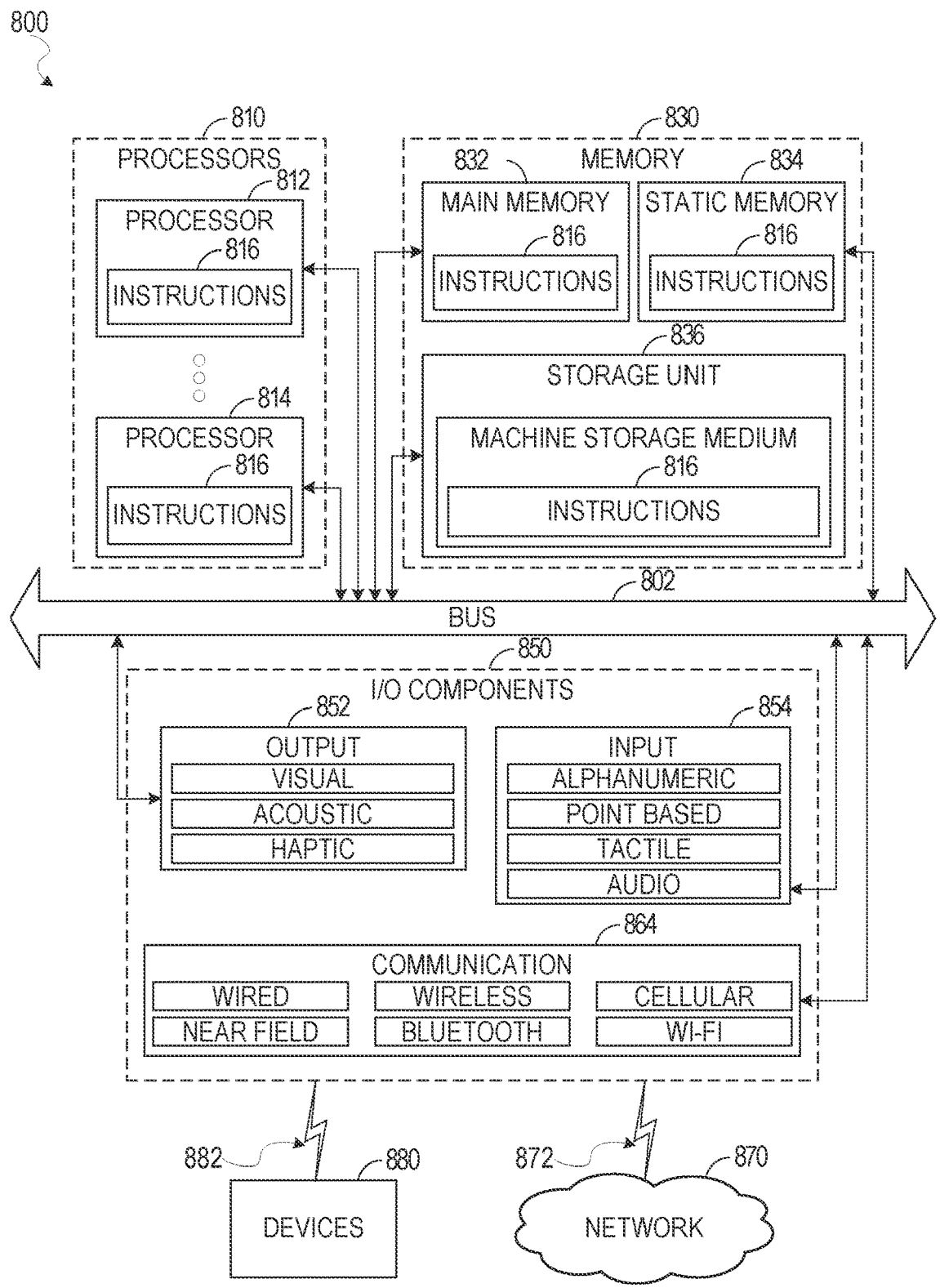
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of the method 600. As another example, the instructions 816 may cause the machine 800 to implement portions of the functionality illustrated in any one or more of FIGS. 4A, 4B, and 5. In this way, the instructions 816 transform a general, non-programmed machine into a particular machine 800 (e.g., the compute service manager 108, the execution platform 110, and the computing device 112) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 870 or devices 880 via a coupling 872 and a coupling 882, respectively. For example, the communication components 864 may include a network interface component or another suitable device to interface with the network 870. In further examples, the communication components 864 may include wired communication components, wireless communication components, cellular communication components, and other communication components to provide communication via other modalities. The devices 880 may be another machine or any of a wide variety of peripheral devices (e.g., a peripheral device coupled via a universal serial bus (USB)). For example, as noted above, the machine 800 may correspond to any one of the compute service manager 108, the execution platform 110, and the devices 880 may include the data storage device 206 or any other computing device described herein as being in communication with the database system 102 or the storage platform 104.

Executable Instructions and Machine Storage Medium

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 870 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 870 or a portion of the network 870 may include a wireless or cellular network, and the coupling 872 may be a Code Division Multiple Access (CDMA) connection, a Global System for Mobile communications (GSM) connection, or another type of cellular or wireless coupling. In this example, the coupling 872 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 870 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 882 (e.g., a peer-to-peer coupling) to the devices 880. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 600 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
    at least one hardware processor; and
    at least one memory storing instructions that cause the system to perform operations comprising:
    providing a user interface element to enable sharing of cloud data with a first application, the cloud data being associated with a first account of a database system, the user interface element being operable to specify whether the cloud data to be shared with the first application includes second-party application data along with customer data from the first account;
    receiving a request to share the cloud data associated with the first account of the database system with the first application, the request being generated based on interaction with the user interface element, the request indicating that the first application is permitted to access the second-party application data along with the customer data from the first account;
    based on the request indicating that the first application is permitted to access the second-party application data, identifying the second-party application data in a second account of the database system based on the first account being granted access to the second-party application data, the second-party application data comprising application data of a second application provided by a second-party application provider corresponding to the second account;
    based on the request indicating that the first application is permitted to access the second-party application data along with the customer data from the first account, verifying compatibility of the cloud data with the application by performing one or more validations of the cloud data, the performing of the one or more validations comprising validating a schema of the cloud data, the cloud data comprising the customer data from the first account and the second-party application data in the second account; and enabling the first application to access the cloud data associated with the first account based on the verifying of the compatibility of the cloud data with the application.

2. The system of claim 1, wherein the application data is consumed or created by the second application.

3. The system of claim 1, wherein:
the request is received from a computing device executing the first application; and
the user interface element is provided to the first application; and
the first application causes the computing device to present the user interface element.

4. The system of claim 3, wherein:
the user interface element is a first user interface element; and
the operations further comprise:
providing, to the first application, a second user interface element to receive security credentials associated with the first account, wherein the first application causes the computing device to present the second user interface element;
receiving an authentication request generated based on user interaction with the second user interface element, the authentication request comprising security credentials associated with the first account; and
authenticating the security credentials associated with the first account.

5. The system of claim 4, wherein the first user interface element is provided in response to authenticating security credentials associated with the first account.

6. The system of claim 1, wherein:
the first application is executable by a first computing device; and
the request to share the customer data with the first application is received from a second computing device.

7. The system of claim 1, wherein:
the request to share the customer data specifies one or more limits on a manner of use of the cloud data by the first application; and the enabling of the first application to access the cloud data comprises restricting use of the cloud data by the first application according to the one or more limits specified in the request.

8. The system of claim 7, wherein the one or more limits include at least one of:
a limit on read or write permissions associated with one or more portions of the cloud data.

9. The system of claim 1, wherein:
the request indicates that the first application is permitted to access third-party data along with the customer data from the first account and the second-party application data, the third-party data corresponding to a third account maintained by the database system, the third account corresponding to a third-party data provider; and
the cloud data further comprises the third-party data.

10. The system of claim 1, wherein the operations further comprise prior to enabling the first application to access the cloud data, performing one or more normalization operations on the cloud data.

11. A method comprising:
providing a user interface element to enable sharing of cloud data with a first application, the cloud data being associated with a first account of a database system, the user interface element being operable to specify whether the cloud data to be shared with the first application includes second-party application data along with customer data from the first account;
receiving a request to share the cloud data associated with the first account of the database system with the first application, the request being generated based on interaction with the user interface element, the request indicating that the first application is permitted to access the second-party application data along with the customer data from the first account;
based on the request indicating that the first application is permitted to access the second-party application data, identifying the second-party application data in a second account of the database system based on the first account being granted access to the second-party application data, the second-party application data comprising application data of a second application provided by a second-party application provider corresponding to the second account;
based on the request indicating that the first application is permitted to access the second-party application data along with the customer data from the first account, verifying compatibility of the cloud data with the application by performing one or more validations of the cloud data, the performing of the one or more validations comprising validating a schema of the cloud data, the cloud data comprising the customer data from the first account and the second-party application data in the second account; and
enabling the first application to access the cloud data associated with the first account based on the verifying of the compatibility of the cloud data with the application.

12. The method of claim 11, wherein the application data is consumed or created by the second application.

13. The method of claim 11, wherein:
the request is received from a computing device executing the first application; and
the user interface element is provided to the first application; and
the first application causes the computing device to present the user interface element.

14. The method of claim 13, wherein:
the user interface element is a first user interface element; and
the method further comprises:
providing, to the first application, a second user interface element to receive security credentials associated with the first account, wherein the first application causes the computing device to present the second user interface element;
receiving an authentication request generated based on user interaction with the second user interface element, the authentication request comprising security credentials associated with the first account; and authenticating the security credentials associated with the first account.

15. The method of claim 14, wherein the first user interface element is provided in response to authenticating security credentials associated with the first account.

16. The method of claim 11, wherein:
the first application is executable by a first computing device; and
the request to share the customer data with the first application is received from a second computing device.

17. The method of claim 11, wherein:
the request to share the customer data specifies one or more limits on a manner of use of the cloud data by the first application, the one or more limits include at least one of a limit on read or write permissions associated with one or more portions of the cloud data; and
the enabling of the first application to access the cloud data comprises restricting use of the cloud data by the first application according to the one or more limits specified in the request.

18. The method of claim 11, further comprising:
prior to enabling the first application to access the cloud data, performing one or more validations of the cloud data to ensure compatibility with the first application.

19. The method of claim 11, further comprising prior to enabling the first application to access the cloud data, performing one or more normalization operations on the cloud data.

20. One or more computer-storage media comprising instructions that, when executed by one or more processors of a machine, configure the machine to perform operations comprising:
providing a user interface element to enable sharing of cloud data with a first application, the cloud data being associated with a first account of a database system, the user interface element being operable to specify whether the cloud data to be shared with the first application includes second-party application data along with customer data from the first account;
receiving a request to share the cloud data associated with the first account of the database system with the first application;
based on the request indicating that the first application is permitted to access the second-party application data, identifying the second-party application data in a second account of the database system based on the first account being granted access to the second-party application data, the second-party application data comprising application data of a second application provided by a second-party application provider corresponding to the second account;
based on the request indicating that the first application is permitted to access the second-party application data along with the customer data from the first account, verifying compatibility of the cloud data with the application by performing one or more validations of the cloud data, the performing of the one or more validations comprising validating a schema of the cloud data, the cloud data comprising the customer data from the first account and the second-party application data in the second account; and
enabling the first application to access the cloud data associated with the first account based on the verifying of the compatibility of the cloud data with the application.

21. The one or more computer-storage media of claim 20, wherein the application data is consumed or created by the second application.

22. The one or more computer-storage media of claim 20, wherein:
the request is received from a computing device executing the first application; and
the user interface element is provided to the first application; and
the first application causes the computing device to present the user interface element.

23. The one or more computer-storage media of claim 22, wherein:
the user interface element is a first user interface element; and
the operations further comprise:
providing, to the first application, a second user interface element to receive security credentials associated with the first account, wherein the first application causes the computing device to present the second user interface element;
receiving an authentication request generated based on user interaction with the second user interface element, the authentication request comprising security credentials associated with the first account; and authenticating the security credentials associated with the first account.

24. The one or more computer-storage media of claim 23, wherein the first user interface element is provided in response to authenticating security credentials associated with the first account.

25. The one or more computer-storage media of claim 20, wherein:
the first application is executable by a first computing device; and
the request to share the customer data with the first application is received from a second computing device.

26. The one or more computer-storage media of claim 20, wherein:
the request to share the customer data specifies one or more limits on a manner of use of the cloud data by the first application; and the enabling of the first application to access the cloud data comprises restricting use of the cloud data by the first application according to the one or more limits specified in the request.

27. The one or more computer-storage media of claim 26, wherein the one or more limits include at least one of:
a limit on read or write permissions associated with one or more portions of the cloud data.

28. The one or more computer-storage media of claim 20, wherein the operations further comprise:
prior to enabling the first application to access the cloud data, performing one or more validations of the cloud data to ensure compatibility with the first application.

29. The one or more computer-storage media of claim 20, wherein the operations further comprise prior to enabling the first application to access the cloud data, performing one or more normalization operations on the cloud data.

* * * * *